(12) United States Patent
Muneyoshi

(10) Patent No.: US 11,703,129 B2
(45) Date of Patent: Jul. 18, 2023

(54) VALVE DISK OF DOUBLE ECCENTRIC BUTTERFLY VALVE, AND DOUBLE ECCENTRIC BUTTERFLY VALVE

(71) Applicant: KITZ CORPORATION, Chiba (JP)

(72) Inventor: Takanori Muneyoshi, Chino (JP)

(73) Assignee: KITZ CORPORATION, Chiba (JP)

( * ) Notice: Subject to any disclaimer, the term of this patent is extended or adjusted under 35 U.S.C. 154(b) by 42 days.

(21) Appl. No.: 17/433,337

(22) PCT Filed: Feb. 28, 2020

(86) PCT No.: PCT/JP2020/008330
§ 371 (c)(1),
(2) Date: Aug. 24, 2021

(87) PCT Pub. No.: WO2020/175673
PCT Pub. Date: Sep. 3, 2020

(65) Prior Publication Data
US 2022/0145994 A1     May 12, 2022

(30) Foreign Application Priority Data

Feb. 28, 2019 (JP) .................................. 2019-036572
Feb. 28, 2019 (JP) .................................. 2019-036577

(51) Int. Cl.
*F16K 1/22*     (2006.01)
*F16K 1/20*     (2006.01)

(52) U.S. Cl.
CPC ............ *F16K 1/222* (2013.01); *F16K 1/2014* (2013.01)

(58) Field of Classification Search
CPC ................................. F16K 1/222; F16K 1/2014
(Continued)

(56) References Cited

U.S. PATENT DOCUMENTS 3,521,857 A * 7/1970 Over .......................... F16K 1/22
                                                  251/173
3,963,213 A * 6/1976 Brattberg ................ F16K 1/226
                                                  251/192
(Continued)

FOREIGN PATENT DOCUMENTS

JP     52-144433    * 11/1977
JP     56-34161        4/1981
(Continued)

OTHER PUBLICATIONS

International Search Report dated May 19, 2020 in International (PCT) Application No. PCT/JP2020/008330.

*Primary Examiner* — John Bastianelli
(74) *Attorney, Agent, or Firm* — Wenderoth, Lind & Ponack, L.L.P.

(57) ABSTRACT

A valve disk of a double eccentric butterfly valve having boss sections (3, 4) for accommodating a stem (8) and rib sections (6, 7) each extending toward outer edge portions of the valve disk in a direction intersecting a stem (8) from the boss sections are provided on a surface on one side of a disc (2), and each of the ribs respectively excluding the boss sections is provided such that a height from a surface (2a) of the disc on the side on which a distance to an end on the edge portion side of the valve disk is longer than that on the side on which a distance to an end on the edge portion side of the valve disk is short when the heights are respectively compared at positions spaced an equal distance apart from a stem center axis (20), and the butterfly valve.

8 Claims, 6 Drawing Sheets

(58) Field of Classification Search
USPC .................................................. 251/305–308
See application file for complete search history.

(56) References Cited

U.S. PATENT DOCUMENTS

| | | | | |
|---|---|---|---|---|
| 4,037,819 A * | 7/1977 | Kindersley | ............. | F16K 1/226 |
| | | | | 251/305 |
| 4,286,769 A * | 9/1981 | Hubertson | ............ | F16K 1/2263 |
| | | | | 251/306 |
| 4,296,915 A * | 10/1981 | Baumann | ................ | F16K 1/222 |
| | | | | 251/306 |
| 4,489,917 A * | 12/1984 | Baumann | ................ | F16K 1/222 |
| | | | | 251/305 |
| 4,770,393 A * | 9/1988 | Hubertson | ............ | F16K 1/2263 |
| | | | | 251/305 |
| 5,158,265 A * | 10/1992 | Miyairi | .................. | F16K 1/222 |
| | | | | 251/305 |
| 6,702,257 B1* | 3/2004 | Mollmann | ............. | F16K 1/222 |
| | | | | 251/305 |
| 9,377,111 B2* | 6/2016 | De Muinck | ........... | F16K 1/2261 |
| 2011/0073789 A1* | 3/2011 | Yeary | ...................... | F16K 1/222 |
| | | | | 251/118 |
| 2013/0248748 A1* | 9/2013 | Baumann | ............. | F16K 1/2014 |
| | | | | 251/305 |
| 2016/0290514 A1* | 10/2016 | Misumi | ................. | F02M 26/48 |

FOREIGN PATENT DOCUMENTS

| | | |
|---|---|---|
| JP | 3676785 | 7/2005 |
| JP | 2005-226712 | 8/2005 |
| JP | 4659927 | 3/2011 |
| WO | 2019/139004 | 7/2019 |

* cited by examiner

VALVE DISK OF DOUBLE ECCENTRIC BUTTERFLY VALVE, AND DOUBLE ECCENTRIC BUTTERFLY VALVE

TECHNICAL FIELD

The present invention relates to a valve disk of a double eccentric butterfly valve to be attached with a center of a stem being doubly eccentric, and particularly to a valve disk suitable for a flow path of a high-pressure fluid and a butterfly valve provided with the valve disk.

BACKGROUND ART

Generally, a butterfly valve has a simple structure and is small in size and light in weight, and has both a structural advantage that a dimension between surfaces can be made smaller than that in an another type of valve and an functional advantage of being suitable for an automatic operation because an opening-closing operation of the valve can be performed in an operation range of 90 degrees and being excellent in flow rate control, and therefore has been widely used in various forms in various types of scenes such as water supply and discharge, an air conditioning facility, and a factory process. In recent years, a butterfly valve that can more cope with a higher-pressure fluid than in a conventional technique has been required.

Conventionally, a double eccentric butterfly valve has been known as a valve suitable for a flow path of a high-pressure fluid. The double eccentric butterfly valve is attached to a valve disk such that a position of a stem is doubly eccentric, and the double eccentricity makes it possible to ensure a good sealing performance even at a high pressure and at the same time to prevent wear of a seat surface.

If the butterfly valve is used under a high pressure, a high fluid resistance is exerted on a valve disk opened and having an intermediate opening degree. Particularly when the valve disk is fully closed, an entire fluid pressure in a conduit is applied to a surface of the valve disk, and a load from a fluid to be exerted on the valve disk is maximized. The valve disk is deformed upon receiving the load from the fluid, and a deflection of a distal end portion of the valve disk increases. When the distal end portion moves from a seating position of a seat ring, a sealing property is impaired. Accordingly, a strength at which the valve disk is not easily deflected needs to be ensured. However, if the wall thickness of the valve disk is increased to ensure the strength, the weight of the valve disk increases, resulting in problems that cost rises and operability of the valve is impaired. To avoid this, the strength of the valve disk is ensured while the weight thereof is reduced, to reduce the deflection and a stress concentration, and the fluid resistance to be exerted on the valve opened and having an intermediate opening degree are required to decrease.

As the valve disk of the butterfly valve the strength of which has been improved, for example, a valve disk of a butterfly valve in PTL 1 is disclosed. The valve disk of the butterfly valve is for a centric butterfly valve, and a plurality of transverse ribs extending in an X-direction with a Y-axis as a starting point are formed, thereby increasing a rigidity while reducing a wall thickness and achieving a reduction in weight.

In a valve disk of a centric butterfly valve in PTL 2, a valve disk in which a plurality of circular ribs intersecting and contacting a boss section are raised in a concentric shape on front and rear surfaces of a substrate is disclosed. In the valve disk, substantially uniform section moduli are also respectively obtained in cross sections at any angle to a center line of the valve disk by the circular ribs, and the rigidity of the valve disk is made substantially uniform in the entire valve disk to obtain a valve disk having a high rigidity.

CITATION LIST

Patent Literatures

PTL 1: Japanese Patent Application No. 3676785
PTL 2: Japanese Patent Application No. 4659927

SUMMARY OF INVENTION

Technical Problem

However, the valve disk of the butterfly valve in PTL 1 is reinforced by being provided with the ribs on the valve disk to increase the rigidity of the valve disk. However, when the valve disk is reinforced by being provided with the ribs, if a site where a stress concentration occurs is formed, a crack or breakage easily occurs in the site so that durability of the valve disk may not be sufficiently obtained.

In the valve disk of the butterfly valve in PTL 2, the rigidity of the entire valve disk is made substantially uniform to increase the rigidity of the valve disk. However, the magnitude of a bending moment causing the valve disk to be deflected due to a load to be exerted on the valve disk from a fluid greatly differs depending on a site of the valve disk. That is, a central portion in a longitudinal direction of the valve disk is supported by a stem, while there are no support sections on both left and right ends of the valve disk. Particularly, a maximum bending moment is exerted on a center line in a transverse direction of the valve disk, and an amount of deflection of this portion is largest. An attempt to give the valve disk of the butterfly valve in PTL 2 a rigidity in which a sealing property at the time of valve closing is not impaired even if both the left and right ends are deflected requires that the rigidity of the entire valve disk matches the rigidity of a portion having a largest bending moment, thereby causing a manufacturing cost to increase because the wall thickness of the entire valve disk increases and causing operability of the valve to deteriorate by increasing the weight of the valve disk.

In addition thereto, in the case of a double eccentric butterfly valve, a stem center axis and a valve disk center axis are in a positional relationship in which they do not match each other and are displaced from each other. Accordingly, distances from the stem center axis to both ends of a valve disk differ on the left and right sides. As a result, there is a specific problem that respective amounts of deflection at both left and right ends of the valve disk when the valve disk receives a pressure from a fluid are larger on the side on which a distance from the stem center axis is longer. In the butterfly valve, an outer edge portion of the valve disk having a disk shape adheres to a valve seat of a body to perform sealing. However, if the respective amounts of deflection at both the left and right ends of the valve disk differ when the pressure of the fluid is applied, a surface pressure at which the outer edge portion of the valve disk adheres to the valve seat on one side is insufficient, causing a sealing property to deteriorate.

The present invention has been developed to solve the above-described problem, and is directed to providing a valve disk of a double eccentric butterfly valve operability, reliability, and durability of which are improved by preventing a stress concentration from occurring due to a load to be exerted from a fluid in addition to suppressing occurrence of a deflection of the valve disk at the time of valve closing against a high-pressure fluid while achieving a reduction in weight and reducing a difference between respective amounts of deflection at both left and right ends of the valve disk to ensure a sealing property, and the butterfly valve.

Solution to Problem

To attain the above-described object, an invention according to claim 1 provides a valve disk of a double eccentric butterfly valve having a circular outer shape, in which a boss section for accommodating a stem and a rib section extending toward both outer edge portions of the valve disk in a direction intersecting the stem from the boss section are provided on a surface on one side of a disc, a stem center axis passing through a center of the stem is at a position shifting from a valve disk center axis, and the rib section excluding the boss section is provided such that a height from the surface of the disc on the side on which a distance to an end on the edge portion side of the valve disk is long is larger than that on the side on which a distance to an end on the edge portion side of the valve disk is short when the heights are respectively compared at positions spaced an equal distance apart from the stem center axis.

An invention according to claim 2 provides the valve disk of the double eccentric butterfly valve, in which the rib section is provided to gradually increase in height toward the boss section from an end portion on the outer edge side of the valve disk.

An invention according to claim 3 provides the valve disk of the double eccentric butterfly valve, in which an upper surface of the rib section is inclined to decrease at a substantially constant angle toward the outer edge portions of the valve disk from the boss section, and a rib center axis obtained by virtually extending inclined surfaces toward a center of the valve disk and connecting the inclined surfaces to each other is positioned on the opposite side to the stem center axis with respect to the valve disk center axis.

An invention according to claim 4 provides the valve disk of the double eccentric butterfly valve, in which the boss section is divided into a plurality of boss sections such that the stem is partially exposed, the rib section is provided in each of the boss sections obtained by the division, and the rib section and the boss section are consecutively connected to each other such that there occurs no step in a height direction viewed from the surface of the disc and there occurs no linear boundary portion on a side wall surface of the boss section.

An invention according to claim 5 provides the valve disk of the double eccentric butterfly valve, in which the boss section is divided into two boss sections such that the stem is exposed in the vicinity of a center of the valve disk, the rib section is formed nearer the center side of the valve disk in each of the boss sections, and a sidewall surface, on the center side of the valve disk, of the boss section and a sidewall surface, on the center side of the valve disk, of the rib section are provided to form a consecutive single plane.

An invention according to claim 6 provides a double eccentric butterfly valve, in which the valve disk is provided to be openable and closable via the stem by pivotally mounting the stem on upper and lower pivotal mounting sections of a body having a short cylindrical shape and providing the valve disk in the body.

Advantageous Effects of Invention

In the invention according to claim 1, the rib section excluding the boss section is provided such that the height from the surface of the disc on the side on which the distance to the end on the edge portion side of the valve disk is long is larger than that on the side on which the distance to the end on the edge portion side of the valve disk is short when the heights are respectively compared at the positions spaced the equal distance apart from the stem center axis. Accordingly, a section modulus of the rib on the side on which the distance to the end on the edge portion side of the disc, an amount of deflection of which is large when a pressure is received from a fluid, is long is larger than a section modulus of the transverse rib on the side on which the distance to the end on the edge portion side of the disc, an amount of deflection of which is small, is short, and a bending rigidity on the side on which the amount of deflection is large is high so that the disc is not easily deflected. Therefore, a difference between the amounts of deflection at left and right ends of the disc can be reduced.

A transverse rib section the length of which is ensured to the maximum is provided in the vicinity of a center of the disc to which a maximum bending moment is to be exerted by a pressure of a fluid at the time of valve closing is provided, to increase a bending rigidity in a transverse direction of the disc, thereby suppressing occurrence of respective deflections at the left and right ends of the disc. Accordingly, reinforcement in other portions of the disc is hardly required, and an increase in the weight of the disc can be suppressed.

In the invention according to claim 2, the rib section is provided to gradually increase in height toward the boss section from the end portion on the outer edge side of the valve disk. Accordingly, the height of the rib to be provided to increase a bending rigidity in a transverse direction of the disc is kept to the minimum necessary so that an increase in the weight of the valve disk can be suppressed.

In the invention according to claim 3, the upper surface of the rib section is inclined to decrease at a substantially constant angle toward the outer edge portions of the valve disk from the boss section, and the rib center axis obtained by virtually extending the inclined surfaces toward the center of the valve disk and connecting the inclined surfaces to each other is positioned on the opposite side to the stem center axis with respect to the valve disk center axis. Accordingly, when a pressure of a fluid is applied at the time of valve closing, a section modulus on the side on which the disc is easily deflected is made larger than a section modulus on the side on which the disc is not easily deflected to increase a rigidity so that amounts of deflection at left and right ends of the disc can be equalized.

In the invention according to claim 4, the rib section extending toward both the outer edge portions of the valve disk in a direction intersecting the stem from the boss section is provided. Accordingly, a load to be exerted in the direction intersecting the stem in the valve disk is received by the rib section, and can be directly transmitted to the boss section and supported, and a rigidity in the direction intersecting the stem in the valve disk is improved, whereby a sealing property can be ensured by suppressing amounts of deflection at both left and right ends of the disc by a bending moment to be exerted by a load of a fluid. Therefore, the disc can be made light in weight by suppressing the wall thickness of the entire disk.

Further, the rib section and the boss section are consecutively connected to each other by forming the smooth R surface such that no step occurs in the height direction viewed from the surface of the disc and no linear boundary portion occurs on the sidewall surface of the boss section. Accordingly, when a load of a fluid is exerted on the valve disk, a portion where a stress concentration occurs, such as the step or the linear boundary portion, in a connection portion between the boss section and the rib section, which supports the load, does not exist, and a stress is moderately dispersed. As a result, crack occurrence or breakage, for example, caused by a stress concentration does not easily occur, whereby durability of the valve disk can be improved.

In the invention according to claim 5, the boss section is divided into the two boss sections such that the stem is exposed in the vicinity of the center of the valve disk, and the rib section is formed nearer the center side of the valve disk in each of the boss sections. Accordingly, the rib section is provided by ensuring the length thereof to the maximum in the vicinity of the center of the valve disk to which a bending moment is to be most exerted by a load of a fluid. Therefore, a sealing property can be ensured by increasing a bending rigidity in a transverse direction of a central portion of the valve disk and suppressing respective amounts of deflection at both left and right ends of the disc.

The sidewall surface on the valve disk center side of the boss section and the sidewall surface on the valve disk center side of the rib section are provided to form a consecutive single plane. Accordingly, a portion where a stress concentration occurs, such as a step or a linear boundary portion, does not exist, a stress of a connection portion between the boss section and the rib section can be more effectively dispersed, and crack occurrence or breakage, for example, caused by a stress concentration does not easily occur. Therefore, a valve disk having excellent durability can be obtained.

In the invention according to claim 6, there can be obtained a butterfly valve that is light in weight, has a high rigidity, and has an excellent sealing property, and is excellent in operability, reliability, and durability and is suitable for a high-pressure fluid because it is provided with a valve disk in which crack occurrence or breakage, for example, caused by a stress concentration does not easily occur.

DESCRIPTION OF EMBODIMENTS

A preferred embodiment of a valve disk of a double eccentric butterfly valve according to the present invention and the butterfly valve provided with the valve disk will be specifically described with reference to the drawings. FIG. 1, FIG. 2, FIG. 3, and FIG. 4 are respectively a perspective view, a front view, a plan view, and a cross-sectional view of the valve disk of the double eccentric butterfly valve according to the present invention.

Figure 1:
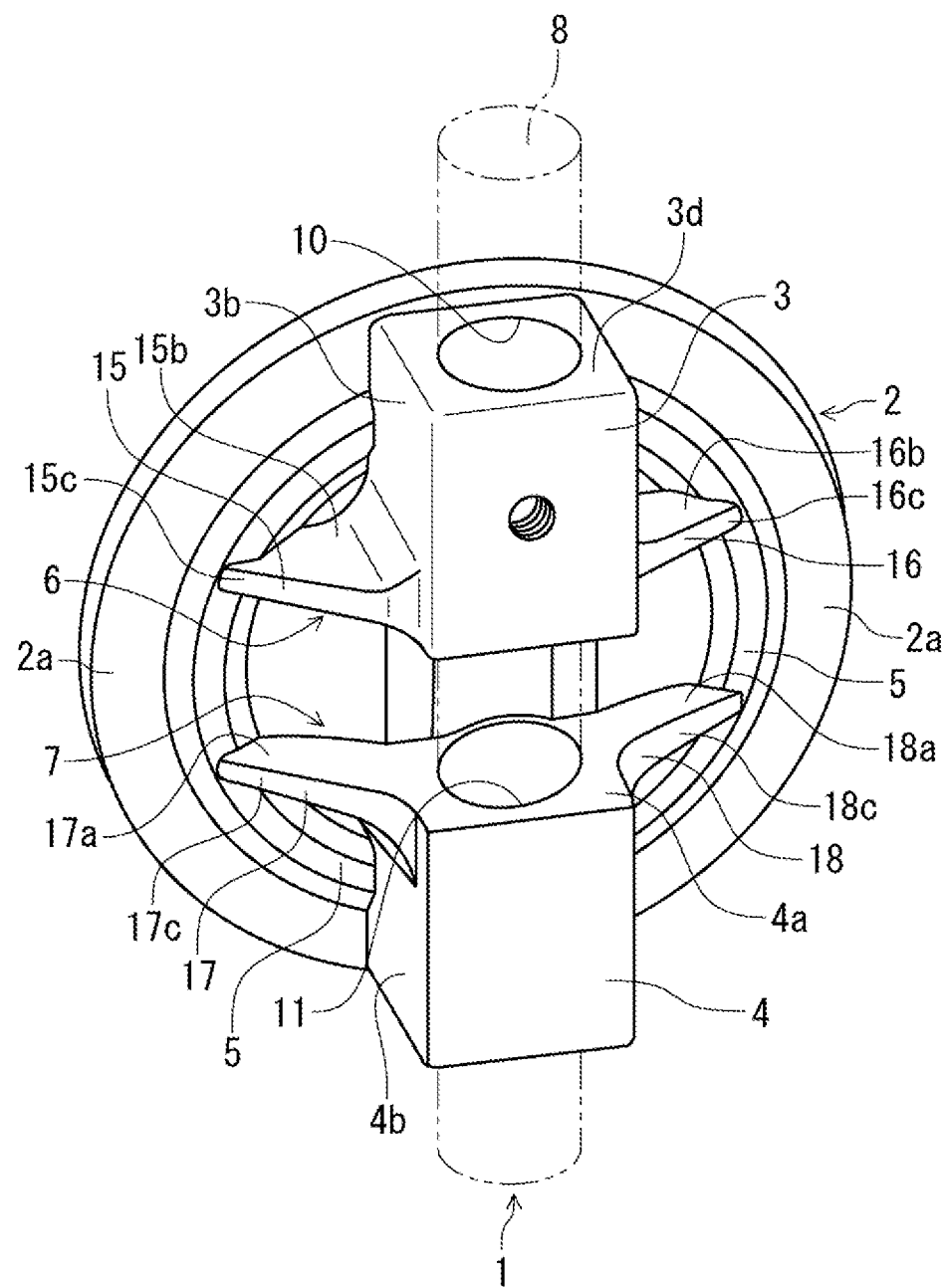
FIG. 1 is a perspective view illustrating a preferred embodiment of a valve disk of a double eccentric butterfly valve according to the present invention.
Figure 2:
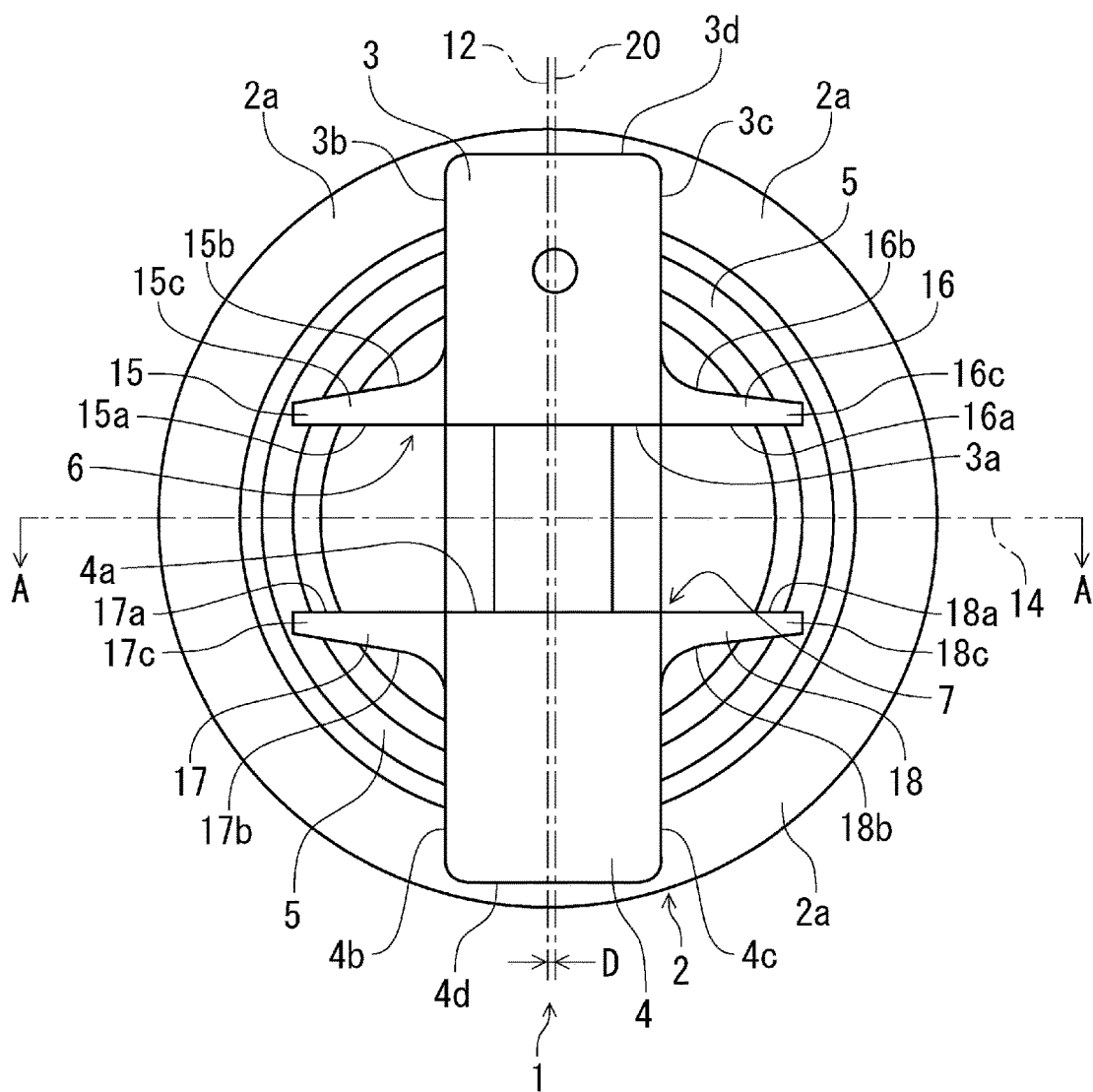
FIG. 2 is a front view of FIG. 1.

As illustrated in FIG. 1 and FIG. 2, a valve disk 1 of a double eccentric butterfly valve includes a disk-shaped disc 2. Boss sections 3 and 4 are respectively provided on upper and lower portions of a surface 2a on one side of the disc 2, and an annular rib section 5 and rib sections 6 and 7 are provided on the surface 2a.

A boss section is divided into the upper boss section 3 and the lower boss section 4 in the disc 2, and is provided with a stem 8 exposed. Hole sections 10 and 11 for mounting the stem 8 are respectively formed in the boss section 3 and the boss section 4 so that the stem 8 is insertable therethrough.

Figure 3:
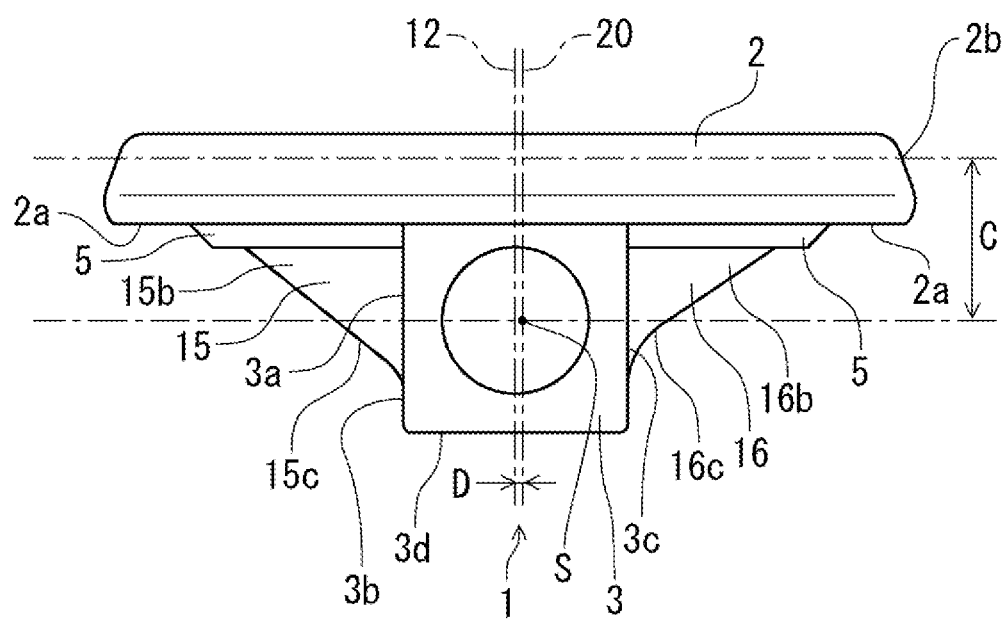
FIG. 3 is a plan view of FIG. 1.

As illustrated in FIG. 3, the boss section 3 is provided on the surface 2a of the disc 2 with a center S of the hole section 10 spaced a distance C apart from a seal position 2b of the disc (single eccentricity) and also spaced a distance D apart from a center line (a valve disk center axis 12) of a valve disk main body 1 (double eccentricity). The boss section 4 is provided to be linearly symmetrical to the boss section 3 with a valve disk horizontal axis 14 as an axis of symmetry, as illustrated in FIG. 2, and the hole section 10 and the hole section 11 are coaxially formed.

When the stem 8 is inserted into the hole section 10 in the boss section 3 and the hole section 11 in the boss section 4, the center S of the hole section 10 and the hole section 11 is a rotation center of the stem 8. The valve disk 1 eccentrically rotates around the center S of the hole section 10 and the hole section 11 and is closable when rotating the stem 8. The valve disk 1 is made of a metal. For example, a stainless steel such as SCS13A or SCS14A is used.

Figure 4:
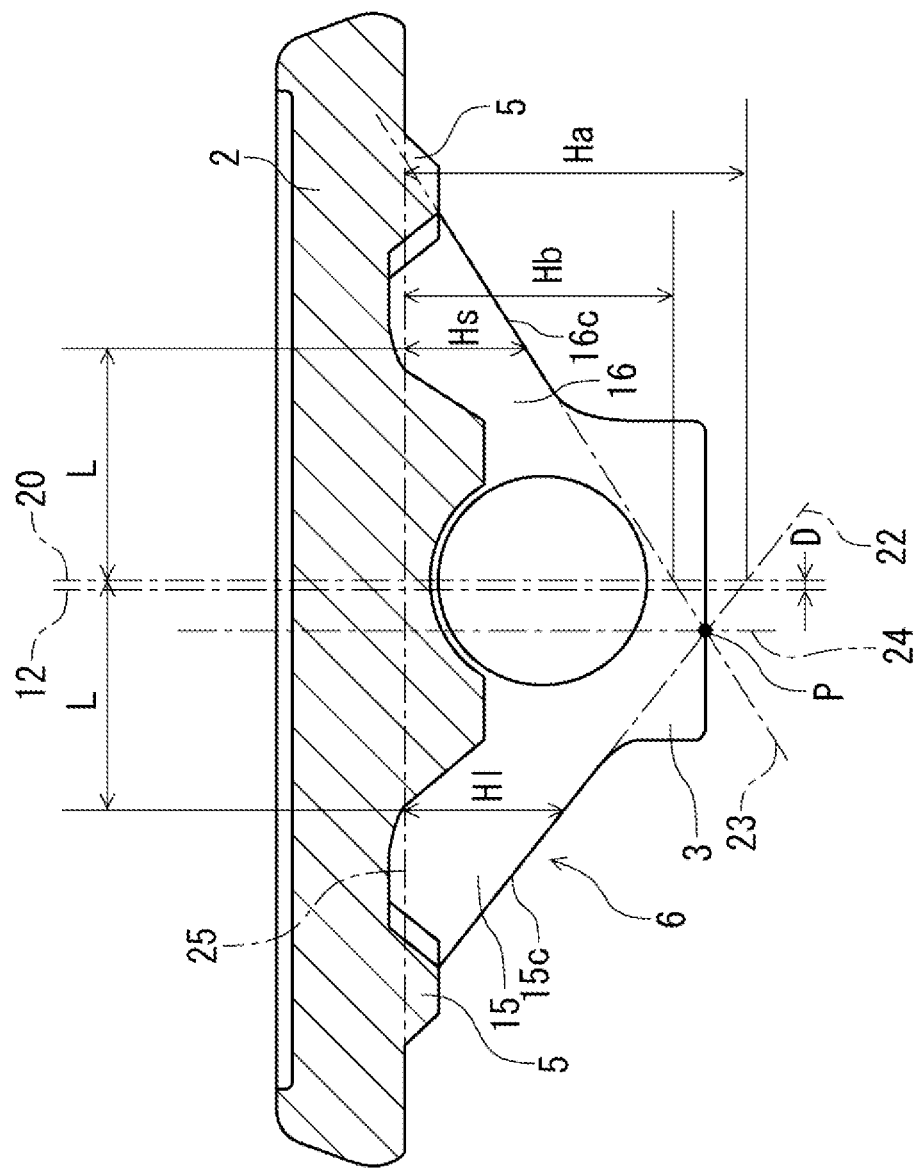
FIG. 4 is a cross-sectional view taken along a line A-A illustrated in FIG. 2.

The annular rib section 5 is formed to protrude toward the surface 2a of the disc concentrically with the disc 2, that is, in a ring shape having a smaller diameter than the diameter of the disc 2 with an intersection point O between the valve disk center axis 12 and the valve disk horizontal axis 14 of the disc 2 used as its center. The annular rib section 5 is connected to sidewall surfaces 3a and 3b of the boss section 3 and sidewall surfaces 4a and 4b of the boss section 4, as illustrated in FIG. 2, and its cross-sectional shape is trapezoidal, as illustrated in FIG. 4. Thus, the ring-shaped annular rib section 5 is formed to protrude on the surface 2a of the disc 2 to increase the strength and the bending rigidity of the entire disc 2.

The rib section 6 is provided in a substantially horizontal state nearer the sidewall surface 3a on the valve disk center side (the valve disk horizontal axis 14 side) of the boss section 3, and includes a long rib 15 connected to the sidewall surface 3b of the boss section 3 and a short rib 16 connected to the sidewall surface 3c of the boss section 3 as illustrated in FIG. 2. Respective distal ends on the valve disk outer edge side of the long rib 15 and the short rib 16 are connected to and integrated with the annular rib section 5.

Similarly, the rib section 7 is provided in a substantially horizontal state nearer the sidewall surface 4a on the valve disk center side (the valve disk horizontal axis 14 side) of the boss section 4, and includes a long rib 17 connected to the sidewall surface 4b of the boss section 4 and a short rib 18 connected to the sidewall surface 4c of the boss section 4. Respective distal ends on the valve disk outer edge side of the long rib 17 and the short rib 18 are connected to and integrated with the annular rib section 5.

Although respective boundaries between the distal ends on the valve disk outer edge side of the long rib 15 and the short rib 16 and the long rib 17 and the short rib 18 and the annular rib section 5 are represented by lines to clarify a positional relationship between the rib sections 6 and 7 and the annular rib section 5 in FIG. 2, the boundaries are also actually configured to be consecutively connected to one another by forming a smooth R surface such that no steps or linear boundary portions do not occur so that a stress concentration does not occur. (The same applies in FIG. 1, FIG. 3, and FIG. 4.)

As illustrated in FIG. 2, the boss section 3 and the boss section 4 and the rib section 6 and the rib section 7 are respectively similarly configured except that they are linearly symmetrical with the valve disk horizontal axis 14 used as an axis of symmetry. Therefore, details of the rib sections 6 and 7 will be described using the rib section 6.

Although the long rib 15 and the short rib 16 are formed up to the annular rib section 5 toward both the outer edge sides of the valve disk 1, respectively, from the sidewall surfaces 3b and 3c of the boss section 3 in the rib section 6, the annular rib section 5 is formed concentrically with the disc 2 with a center point O of the disc 2 as its center, while a stem center axis 20 as a center of the boss section 3 shifts by the distance D from the valve disk center axis 12, as illustrated in FIG. 2. Therefore, the length of the long rib 15 is larger by 2D than the length of the short rib 16 even if the sidewall surfaces 3b and 3c of the same boss section 3 are respectively used as origins.

As illustrated in FIG. 3, respective shapes of the long rib 15 and the short rib 16 viewed from the side of an end surface 3d on the valve disk outer peripheral side of the boss section 3 are each a substantially right-angled triangle, and an inclined upper surface 15c of the long rib 1 and an inclined upper surface 16c of the short rib 16 each corresponding to an oblique side of the substantially right-angled triangle are respectively provided to gradually decrease in height from the surface 2a of the disc 2 toward both outer edges of the valve disk 1 from the sidewall surfaces 3b and 3c of the boss section 3.

The sidewall surface 3a on the valve disk center side of the boss section 3, a sidewall surface 15a on the valve disk center side of the long rib 15, and a sidewall surface 16a on the valve disk center side of the short rib 16 are connected to one another to constitute a single plane, that is, to be what is called flush with one another. Accordingly, the length of the rib section 6 can be ensured to the maximum, and a stress of a connection portion between the boss section 3 and the rib section 6 can be more effectively dispersed.

As illustrated in FIG. 2 and FIG. 3, a sidewall surface 15b on the opposite side to the sidewall surface 15a of the long rib 15 is consecutively connected to the sidewall surface 3b of the boss section 3 by forming a smooth R surface such that no linear boundary portion occurs, and the inclined upper surface 15c of the long rib 15 is consecutively connected to the sidewall surface 3c of the boss section 3 by forming a smooth R surface such that no step occurs in a height direction viewed from the surface 2a of the disc 2.

Similarly, a sidewall surface 16b on the opposite side to the sidewall surface 16a of the short rib 16 is consecutively connected to the sidewall surface 4b of the boss section 4 by forming a smooth R surface such that no linear boundary portion occurs, and the inclined upper surface 16c of the short rib 16 is consecutively connected to the sidewall surface 4c of the boss section 4 by forming a smooth R surface such that no step occurs in the height direction viewed from the surface 2a of the disc 2.

Thus, the long rib 15 and the short rib 16 in the rib section 6 are consecutively connected to the boss section 3 by forming the smooth R surface such that no step or linear boundary portion occurs, and are configured integrally with the boss section 3. Accordingly, a portion, where a stress concentration occurs, such as a step or a linear boundary portion does not exist in the connection portion between the boss section 3 and the rib section 6 that supports a load of a fluid. Therefore, a portion where a stress concentration occurs does not exist, and a stress is moderately dispersed. As a result, crack occurrence or breakage, for example, caused by a stress concentration does not easily occur in the boss section 3 and the rib section 6 so that durability of the valve disk 1 can be improved.

Further, the long rib 15 and the short rib 16 are directly connected to the boss section 3 having a significantly high rigidity, and the long rib 15, the short rib 16, and the boss section 3 are integrated with one another to constitute the rib section 6.

Accordingly, the bending rigidity of the entire rib section 6 can be significantly improved.

Generally, in a butterfly valve, if a load of a fluid is exerted on a valve disk at the time of valve closing, a central portion in a longitudinal direction of the valve disk is supported by a stem. On the other hand, no support sections respectively exist at both left and right ends in a transverse direction of the valve disk. Accordingly, a maximum bending moment is exerted particularly in the transverse direction of the central portion of the valve disk, and respective amounts of deflection at both the left and right ends of the central portion of the valve disk are largest.

However, in the valve disk 1, the rib section 6 and the rib section 7 the respective lengths of which are ensured to the maximum are provided parallel to each other with the valve disk horizontal axis 14 sandwiched therebetween in the vicinity of the center of the valve disk to which a maximum bending moment is to be exerted by a pressure of a fluid at the time of valve closing, to increase a bending rigidity in a transverse direction of a central portion of the disc 2. Therefore, respective amounts of deflection at both left and right ends of the disc 2 are suppressed by the bending moment to be exerted by a load of the fluid at the time of valve closing so that a sealing property can be ensured, and reinforcement in other portions of the disc 2 is hardly required so that an increase in the weight of the disc 2 can be suppressed.

As described above, in the valve disk 1, the annular rib section 5 is provided to increase the strength and the rigidity of the entire disc 2, and the rib section 6 and the rib section 7 the respective lengths of which are ensured to the maximum are provided parallel to each other with the valve disk horizontal axis 14 sandwiched therebetween in the vicinity of the center of the valve disk to which the maximum bending moment is to be exerted by the pressure of the fluid at the time of valve closing to increase the bending rigidity in the transverse direction of the central portion of the disc 2, thereby suppressing the respective amounts of deflection at both the left and right ends of the disc 2 at the time of valve closing.

Further, the annular rib section 5 and the boss sections 3 and 4, the rib section 6 and the boss section 3, the rib section 7 and the boss section 4, and the annular rib section 5 and the rib sections 6 and 7 are respectively connected to each other, and the boss sections 3 and 4, the annular rib section 5, and the rib sections 6 and 7 are integrally configured. Accordingly, a load and a bending moment to be exerted on the valve disk 1 can be borne integrally with one another. As a result, occurrence of a deformation or a deflection of the valve disk 1 is more effectively suppressed so that a sealing property can be ensured than when the valve disk 1 is provided without connecting the annular rib section 5 and the rib sections 6 and 7 to the boss sections 3 and 4 and without connecting the annular rib section 5 and the rib sections 6 and 7 to each other.

Then, as illustrated in FIG. 3, respective shapes of side surfaces of the long rib 15 and the short rib 16 in the rib section 6 viewed from the end surface 3d side of the boss section 3 are substantially right-angled triangular. Thus, the reason why the long rib 15 and the short rib 16 are substantially right-angled triangular and the shape of the side surface of the long rib 15 is set larger than the shape of the side surface of the short rib 16 will be a described below.

In a butterfly valve, an outer edge portion of a disk-shaped disc adheres to a valve seat of a body to perform sealing. However, when an amount of deflection of the outer edge portion of the disc increases, a surface pressure at which the outer edge portion of the disc adheres to the valve seat of the body is insufficient, causing a sealing property to deteriorate. Accordingly, the amount of deflection of the outer edge portion of the disc at the time of valve closing needs to fall within a range in which a sufficient sealing property is obtained.

In the case of a double eccentric butterfly valve, a stem center axis and a valve disk center axis are in a positional relationship in which they do not match each other and are eccentric. Therefore, respective distances from the stem center axis to both left and right ends of a disc differ. Accordingly, when a load is received from a fluid, a larger bending moment occurs on the side on which a distance from the stem center axis is long (hereinafter referred to as the long side) than on the side on which a distance from the stem center axis is short (hereinafter referred to as the short side), and an amount of deflection of an outer edge portion on the long side is larger than an amount of deflection of an outer edge portion on the short side. In the double eccentric butterfly valve, when respective amounts of deflection at both left and right ends of the disc differ at the time of valve closing, a surface pressure at which the outer edge portion of the disc adheres to a valve seat on one side is insufficient, causing a sealing property to deteriorate.

Therefore, in the double eccentric butterfly valve, the respective amounts of deflection at both the left and right ends of the disc at the time of valve closing are suppressed, and a difference between the amounts of deflection at the left and right ends of the disc caused by eccentricity of the stem can be made as small as possible, thereby requiring that no difference occurs between the respective amounts of deflection at the left and right ends, if possible.

In the valve disk of the double eccentric butterfly valve according to the present invention, the respective degrees of reinforcement of the disc 2 by the rib sections 6 and 7 are made to differ, that is, a rigidity is made higher on the long side on which the disc 2 is greatly deflected than on the short side on which the disc 2 is less deflected, to equalize the amounts of deflection at the left and right ends of the disc 2.

Each of the rib sections 6 and 7 provided on the surface 2a of the disc 2 has an effect of making it difficult to deflect the disc 2 because the larger a height from the surface 2a is, the larger a section modulus becomes. Therefore, the height of the long rib 15 provided on the long side is made larger as a whole than the height of the short rib 16 provided on the short side, thereby making the disc 2 difficult to deflect on the long side on which the long rib 15 is provided.

That is, as illustrated in FIG. 4, the respective heights of the long rib 15 and the short rib 16 are set such that a height HI of the long rib 15 provided on the long side, excluding the boss section 3, from the surface 2a of the disc 2 is larger than a height Hs of the short rib 16 provided on the short side, excluding the boss section 3, from the surface 2a of the disc 2 when compared with each other, respectively, at positions spaced an equal distance L apart from the stem center axis 20.

When the respective heights of the long rib 15 and the short rib 16 are thus set, the disc 2 is more reinforced and difficult to deflect on the long side on which it is easily deflected than on the short side. As a result, a difference between the respective amounts of deflection of the outer edge portion on the long side and the outer edge portion on the short side can be reduced.

A relationship between the respective heights of the long rib 15 provided on the long side and the short rib 16 provided on the short side from the surface 2a need not necessarily hold at all positions of the ribs, and the relationship between the heights may be partially reversed for convenience of design, for example. For example, the long rib 15 may be higher than the short rib 16 when the long rib 15 and the short rib 16 are compared with each other in terms of average height.

A rib for reinforcing a valve disk may be provided to gradually decrease in height toward an outer edge of a disc from a boss section from the viewpoint of manufacturability or the like, and an upper surface of the rib, excluding the vicinity of a connection portion with the boss section and the vicinity of a connection portion with an outer edge of the valve disk, is inclined at a substantially constant angle. In this case, a shape of the rib can approximate a right-angled triangle surrounded by a side (bottom side) of a position corresponding to a surface of the disc, a side (oblique side) of an inclined portion at a predetermined angle of the upper surface of the rib, and a side (height) on a stem center axis, as viewed from the side.

An idea of a beam having an equal strength (a cantilever receiving a uniformly distributed load on a bottom side of a right-angled triangle) in material mechanics may be applicable to the strength of a rib having a shape of a side surface of such a virtual right-angled triangle. An amount of deflection of a cantilever approximating the rib can be calculated from a formula of the beam having an equal strength. Therefore, respective heights of the virtual right-angled triangle on the long side and the short side (heights Ha and Hb of the right-angled triangle to be virtualized on the stem center axis 20) can be set such that a difference between respective amounts of deflection of distal ends of the ribs on the long side and the short side decreases based on the formula.

When a shape of a side surface of a rib section is obtained using the method, an increase in the weight of the valve disk can be suppressed by keeping the height of the rib to be provided to increase a bending rigidity in a transverse direction of the disc to the minimum necessary.

Actually, a load of a fluid at the time of valve closing is received by the entire valve disk including not only the rib section but also the disc and the boss section, and the amount of deflection is also affected by the thickness and the size, for example, of the disc. Therefore, the idea of the beam having an equal strength may be unapplicable as it is. However, the difference between the respective heights of the virtual right-angled triangle on the long side and the short side is preferably set to a difference in height or more to be derived based on the idea of the beam having an equal strength.

As illustrated in FIG. 4, the long rib 15 and the short rib 16 are respectively provided to be inclined at a substantially constant angle such that inclined upper surfaces 15c and 16c gradually increase in height, respectively, toward the boss sections 3 and 4 from ends on the outer edge side of the valve disk, and a rib center line 24 passing through an intersection point P between virtual lines 22 and 23 respectively obtained by virtually extending the inclined upper surfaces 15c and 16c along the center of the valve disk is positioned on the opposite side to the stem center axis 20 with respect to the valve disk center axis 12.

Thus, in the valve disk 1, the rib center line 24 passing through an apex P of a rib triangle constituted by the long rib 15, the short rib 16, and the surface 2a of the disc 2 (a triangle formed by the virtual line 22 obtained by extending the inclined upper surface 15c of the long rib 15, the virtual line 23 obtained by extending the inclined upper surface 16c of the short rib 16, and a line 25 representing the surface of the disc 2 in FIG. 4) is offset toward the opposite side of the stem center axis 20 with respect to the valve disk center axis 12, to increase a rigidity by making a section modulus on the side on which the disc is easily deflected larger than a section modulus on the side on which the disc is not easily deflected, thereby equalizing the respective amounts of deflection at the left and right ends of the disc.

Figure 5:
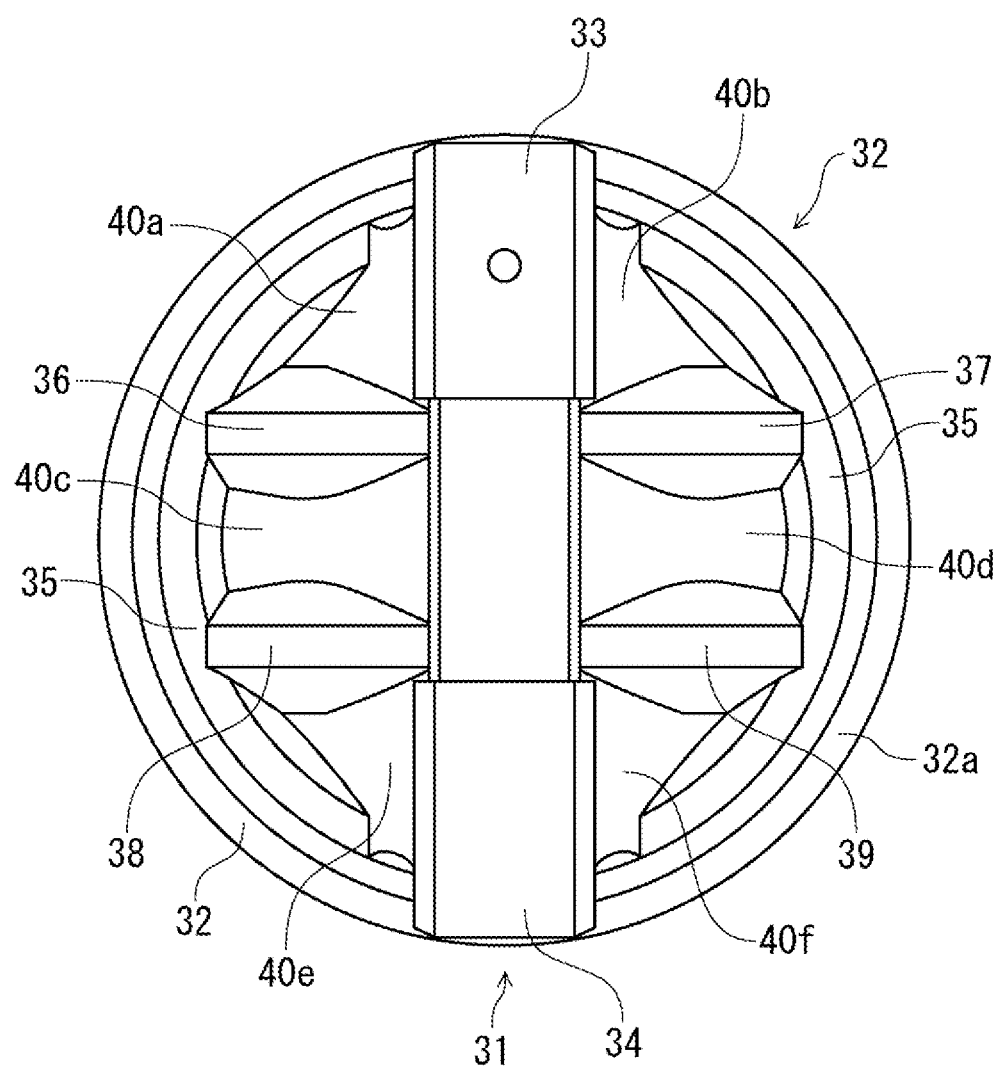
FIG. 5 is a front view of a valve disk of a double eccentric butterfly valve in a comparative example.

To confirm an effect of reducing the difference between the amounts of deflection at the left and right ends of the disc in the valve disk of the double eccentric butterfly valve according to the present invention and an effect of suppressing the weight of the valve disk, an analysis using an FEM (finite element method) was performed for respective valve disks of double eccentric butterfly valves in the embodiment illustrated in FIG. 1 and a comparative example illustrated in FIG. 5.

Although the embodiment illustrated in FIG. 1 is configured as described above, a valve disk 31 in the comparative example illustrated in FIG. 5 includes a disk-shaped disc 32 and has a configuration in which boss sections 33 and 34 are respectively provided in upper and lower portions of a surface 32a on one side of the disc 32 and an annular rib section 35 for reinforcement, rib sections 36, 37, 38, and 39 for reinforcement, and hollowed sections 40a, 40b, 40c, 40d, 40e, and 40f are provided on the surface 32a.

Although the annular rib section 35 and the rib sections 36, 37, 38, and 39 are connected to each other in the valve disk 31 of the double eccentric butterfly valve in the comparative example, the boss sections 33 and 34 provided in the upper and lower portions of the disc 32 and the rib sections 36, 37, 38, and 39 are not connected to each other. The comparative example greatly differs from the embodiment in that the boss sections and the rib sections are not connected to each other. The valve disk of the double eccentric butterfly valve in the comparative example has a usage achievement in a butterfly valve having a maximum allowable pressure of 2 Mpa and has an excellent sealing property.

In performing an analysis, amounts of displacement (amounts of deflection) at left and right ends on a horizontal axis of the valve disk and the weight of the valve disk in a case where a fluid pressure of 5.111 MPa was applied were obtained for each of the embodiment and the comparative example for each size of the valve disk illustrated in Table 1. A reduction rate (deflection improvement rate) at which a difference between the amounts of deflection at the left and right ends of the valve disk decreased in the embodiment relative to that in the comparative example was calculated based on the result.

The deflection improvement rate and an increase rate of the weight of the valve disk for each size obtained by the analysis are illustrated in Table 1. In Table 1, a positive direction means a case where a fluid pressure is applied from the primary side, and a negative direction means a case where a fluid pressure is applied from the secondary side.

TABLE 1

| Nominal diameter of valve disk | Pressing direction | Deflection improvement rate(%) | Increase rate of weight of valve disk (%) |
|---|---|---|---|
| 300A | Positive direction | 62 | 105 |
|  | Negative direction | 62 |  |
| 250A | Positive direction | 61 | 106 |
|  | Negative direction | 60 |  |
| 200A | Positive direction | 78 | 118 |
|  | Negative direction | 79 |  |
| 150A | Positive direction | 74 | 113 |
|  | Negative direction | 76 |  |
| 125A | Positive direction | 79 | 123 |
|  | Negative direction | 83 |  |
| 100A | Positive direction | 78 | 118 |
|  | Negative direction | 81 |  |
| 80A | Positive direction | 76 | 113 |
|  | Negative direction | 82 |  |
| 65A | Positive direction | 70 | 113 |
|  | Negative direction | 75 |  |

As illustrated in Table 1, according to a configuration of the valve disk in the embodiment, it was confirmed that the deflection improvement effect for reducing the difference between the amounts of deflection at the left and right ends of the valve disk was significantly obtained without the weight of the valve disk being more greatly increased than in the comparative example.

Figure 6:
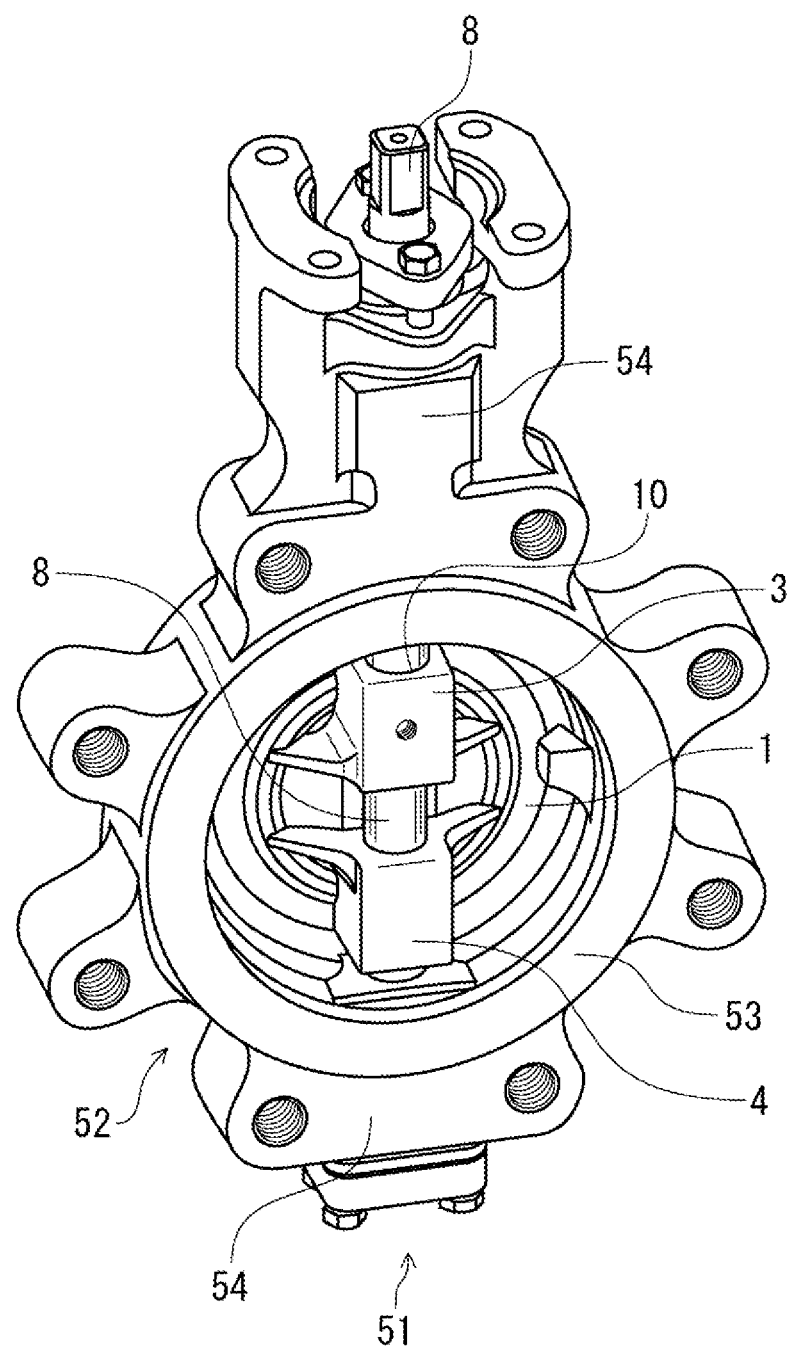
FIG. 6 is a perspective view illustrating an embodiment of a double eccentric butterfly valve.

Then, an example in which the valve disk 1 according to the present invention is attached to a double eccentric butterfly valve will be described. FIG. 6 is a perspective view of a double eccentric butterfly valve 51 with a valve disk 1 according to the present invention mounted on a valve main body 52 and the valve fully closed.

The valve main body 52 includes a body 53 having a short cylindrical shape, and pivotal mounting sections 54 for pivotally mounting a stem 8 in the valve disk 1 are respectively provided in upper and lower portions of the body 53. The valve disk 1 is arranged in the body 53, the stem 8 is pirovatally mounted on a hole section 10 in a boss section 3 in the valve disk 1 in this state, and the valve disk 1 is integrally fastened to the stem 8 with a taper pin not illustrated. As a result, the stem 8 remains rotatable with respect to the body 53 and remains unmovable in an up-down direction. When the valve disk 1 is disposed in place in the body 53, to rotate the stem 8, the valve disk 1 can be rotated to be openable and closable via the stem 8.

The double eccentric butterfly valve 51 can cope with both a case where a fluid pressure is applied from the surface side on which the boss section 3 in the valve disk 1 is provided and a case where a fluid pressure is applied from the opposite side to a surface on which the boss section 3 is provided, and can be reliably sealed in a valve closed state in both flow directions.

A valve opening and closing operation can also be manually performed by attaching a handle for manual operation to an upper end portion of the stem 8, or can also be automatically performed by loading an actuator thereon.

As described above, the valve disk of the double eccentric butterfly valve according to the present invention can suppress occurrence of deflections at both the left and right end portions of the disc at the time of valve closing without the weight thereof being more greatly increased than that of the conventional valve disk because it is provided by connecting to the boss section the transverse rib in which the length is ensured to the maximum in the vicinity of the center of the disc to which a large bending moment is to be exerted by a pressure of a fluid at the time of valve closing to increase the bending rigidity of the disc.

In providing the rib to increase the bending rigidity of the disc, a section modulus of the rib to be provided on the side on which a deflection easily occurs is increased to increase the rigidity, and respective amounts of deflection at both the left and right ends of the disc are equalized. Therefore, a sufficient sealing property can be obtained at the time of valve closing.

Further, in connecting the boss section and the rib section to each other, the boss section and the rib section are consecutively connected to each other by forming a smooth R surface such that there occurs a portion where a stress concentration occurs, such as a step or a linear boundary portion, does not exist. Accordingly, a stress of the connection portion between the boss section and the rib section can be more effectively dispersed. Therefore, crack occurrence or breakage, for example, caused by a stress concentration does not easily occur so that the valve disk has an excellent durability.

The double eccentric butterfly valve according to the present invention is light in weight, has a high rigidity, and has an excellent sealing property, and is excellent in operability, reliability, and durability, and is applicable to a fluid at a higher pressure than in the conventional technique because it is provided with a valve disk in which crack occurrence or breakage, for example, caused by a stress concentration does not easily occur.

REFERENCE SIGNS LIST 1 valve disk
2 disc
2a surface of disc
3, 4 boss section
5 annular rib section
6, 7 rib section
8 stem
51 double eccentric butterfly valve
52 valve main body
C distance between seal position of disc and center of hole section in boss section
D distance between valve disk center axis and center of hole section in boss section
Ha height of right-angled triangle formed by long rib virtualized on stem center axis
Hb height of right-angled triangle formed by short rib virtualized on stem center axis
HI height of long rib from surface of disc at position spaced distance L apart from stem center axis
Hs height of short rib from surface of disc at position spaced distance L apart from stem center axis
O intersection point between valve disk center axis and valve disk horizontal axis
P apex of rib triangle constituted by long rib, short rib, and surface of disc
S center of hole section in boss section

The invention claimed is:

1. A valve disk of a double eccentric butterfly valve, the valve disk having a circular outer shape and comprising:
   a boss section for accommodating a stem; and
   a rib section extending toward both outer edge portions of the valve disk in a direction intersecting the stem from the boss section,
   wherein the boss section and the rib section are provided on a surface on one side of a disc, and a stem center axis passing through a center of the stem is at a position shifted from a valve disk center axis,
   wherein the boss section is divided into a plurality of boss sections such that the stem is partially exposed, the rib section is provided in each of the boss sections obtained by the division, and the rib section and the boss section are consecutively connected to each other such that there occurs no step in a height direction viewed from the surface of the disc and there occurs no linear boundary portion on a side wall surface of the boss section, and
   wherein the boss section is divided into two boss sections such that the stem is exposed in the vicinity of a center of the valve disk, the rib section is formed nearer the center side of the valve disk in each of the boss sections, and a sidewall surface, on the center side of the valve disk, of the boss section and a sidewall surface, on the center side of the valve disk, of the rib section are provided to form a consecutive single plane.

2. The valve disk of the double eccentric butterfly valve according to claim 1, wherein the rib section is provided so as to gradually increase in height toward the boss section from an end portion on the outer edge side of the valve disk.

3. The valve disk of the double eccentric butterfly valve according to claim 1, wherein an upper surface of the rib section is inclined so as to decrease at a substantially constant angle toward the outer edge portions of the valve disk from the boss section, and a rib center axis obtained by virtually extending inclined surfaces toward a center of the valve disk and connecting the inclined surfaces to each other is positioned on the opposite side to the stem center axis with respect to the valve disk center axis.

4. A double eccentric butterfly valve including the valve disk according to claim 1, wherein the valve disc is openable and closable via the stem by pivotally mounting the stem on upper and lower pivotal mounting sections of a body having a cylindrical shape and providing the valve disk in the body.

5. A valve disk of a double eccentric butterfly valve having a circular outer shape, wherein a boss section for accommodating a stem and a rib section extending toward both outer edge portions of the valve disk in a direction intersecting the stem from the boss section are provided on a surface on one side of a disc, a stem center axis passing through a center of the stem is at a position shifted from a valve disk center axis, and the rib section excluding the boss section is provided such that a height from the surface of the disc on the side on which a distance to an end on the edge portion side of the valve disk is long is larger than that on the side on which a distance to an end on the edge portion side of the valve disk is short when the heights are respectively compared at positions spaced an equal distance apart from the stem center axis,
   wherein the boss section is divided into a plurality of boss sections such that the stem is partially exposed, the rib section is provided in each of the boss sections obtained by the division, and the rib section and the boss section are consecutively connected to each other such that there occurs no step in a height direction viewed from the surface of the disc and there occurs no linear boundary portion on a side wall surface of the boss section, and
   wherein the boss section is divided into two boss sections such that the stem is exposed in the vicinity of a center of the valve disk, the rib section is formed nearer the center side of the valve disk in each of the boss sections, and a sidewall surface, on the center side of the valve disk, of the boss section and a sidewall surface, on the center side of the valve disk, of the rib section are provided to form a consecutive single plane.

6. The valve disk of the double eccentric butterfly valve according to claim 5, wherein the rib section gradually increases in height toward the boss section from an end portion on the outer edge side of the valve disk.

7. The valve disk of the double eccentric butterfly valve according to claim 5, wherein an upper surface of the rib section is inclined to decrease at a substantially constant angle toward the outer edge portions of the valve disk from the boss section, and a rib center axis obtained by virtually extending inclined surfaces toward a center of the valve disk and connecting the inclined surfaces to each other is positioned on the opposite side to the stem center axis with respect to the valve disk center axis.

8. A double eccentric butterfly including the valve disk according to claim 5, wherein the valve disk is provided so as to be openable and closable via the stem by pivotally mounting the stem on upper and lower pivotal mounting sections of a body having a short cylindrical shape and providing the valve disk in the body.

* * * * *